(No Model.)
W. O. CREE.
BLADE HOLDER.
No. 416,902. Patented Dec. 10, 1889.
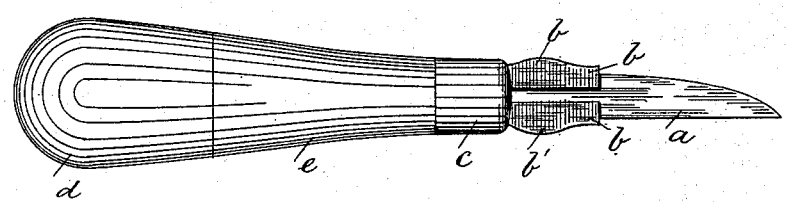
Fig. 1.
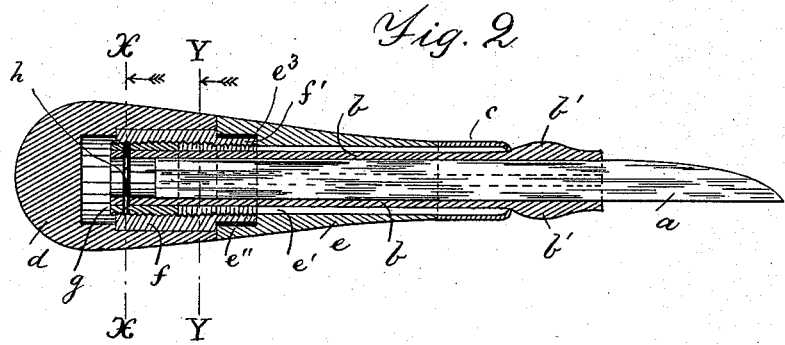
Fig. 2.
Fig. 3.   Fig. 4.   Fig. 5.
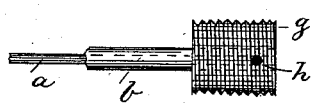 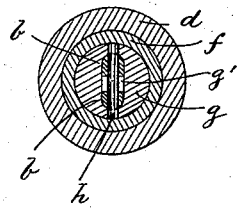 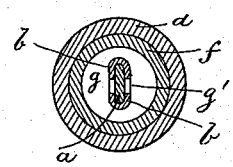
Witnesses.
Geo. W. White.
Selma R. Schelin.
Inventor.
William O. Cree.
by Alban Andrew, his atty.
N. PETERS, Photo-Lithographer, Washington, D. C.

UNITED STATES PATENT OFFICE.

WILLIAM O. CREE, OF BEVERLY, MASSACHUSETTS.

BLADE-HOLDER.

SPECIFICATION forming part of Letters Patent No. 416,902, dated December 10, 1889.

Application filed June 15, 1889. Serial No. 314,507. (No model.)

*To all whom it may concern:*

Be it known that I, WILLIAM O. CREE, a citizen of the United States, and a resident of Beverly, in the county of Essex and State of Massachusetts, have invented new and useful Improvements in Knife-Blade Holders, of which the following, taken in connection with the accompanying drawings, is a specification.

This invention relates to improvements in knife-blade holders for the purpose of securing cutting-blades of varying widths in a handle; and the invention is particularly designed for use in cutting boot and shoe uppers or articles of cloth, leather, &c., although it is equally well adapted for other purposes, or for holding and securing other kinds of tools in the handle, as will hereinafter be more fully shown and described, reference being had to the accompanying drawings, wherein—

Figure 1 represents a side elevation of the improved knife-blade holder, and Fig. 2 represents a central longitudinal section of the same. Fig. 3 represents a side view of the screw-plug to which the grooved clamping-bars are pivoted. Fig. 4 represents a cross-section on the line X X, shown in Fig. 2; and Fig. 5 represents a cross-section on the line Y Y, also shown in Fig. 2.

Similar letters refer to similar parts wherever they occur on the different parts of the drawings.

$a$ represents a knife-blade or tool that is to be secured in the improved holder, and $b\ b$ represent the internally-grooved clamping-bars adapted to receive opposite edges of the blade $a$ in a similar manner to that shown in the patent granted to Samuel A. Cummings, December 5, 1865, No. 51,297, said clamping-bars having at or near their outer ends the cam projections $b'\ b'$, which come in contact with the internal edges of the slotted capped ferrule $c$ when the said clamping-bars are drawn into the handle, and thereby cause the blade or tool $a$ to be clamped and held between the said grooved clamping-bars in a manner similar to that shown and described in the said Cummings patent.

The handle is composed of two parts $d$ and $e$, preferably made of wood. The part $e$ has a longitudinal perforation $e'$, of a shape and size adapted to receive the clamping-bars $b\ b$, and to the forward or upper end of said handle part is secured the ferrule $c$, as shown in Figs. 1 and 2. The handle part $d$ has secured within it the nut $f$, which latter has a cylindrical extension $f'$, adapted to be guided in a corresponding recess $e''$ in the thick end of the handle part $e$, such recess being preferably lined with a metal sleeve $e^3$, so as to prevent the wearing out of such recessed part of the handle $e$, as shown in Fig. 2. In the nut $f$ is screwed the screw-threaded plug $g$, which latter has a longitudinal perforation $g'$, going from end to end of said plug, which perforation serves to receive the ends of the grooved clamping-bars $b\ b$, and the latter are connected to the screw-plug $g$ by means of a pin $h$, that passes through perforations in the plug $g$ and clamping-bars $b\ b$, as shown in Figs. 2, 3, and 4. The pin $h$ is arranged parallel with the knife or blade $a$, so as to permit the clamping-bars $b\ b$ to adjust themselves freely out and in on said pin, according to the width of the knife or blade that is being used.

The operation of the device is as follows: If a knife or blade is secured in position as shown in the drawings, and it is desired to remove it for the purpose of inserting another blade, it is only necessary for the operator to grasp with one hand the handle portion $e$ and with his other hand to take hold of and turn the handle part $d$ toward the left, by which means the nut $f$ is turned around the screw-threaded plug $g$, causing the latter to be moved toward the handle portion $e$, and as the clamping-bars $b\ b$ are connected to said plug said bars will be moved in the same direction, by which their cam-faces $b'\ b'$ are liberated from the edges of the capped ferrule $c$, thus allowing said clamping-bars to expand sufficiently to release the knife or blade $a$, that may now be drawn out from or adjusted between the said grooved clamping-bars.

If it is desired to insert a new blade in the holder, such blade is pushed into the longitudinally-grooved bars $b\ b$ as far as may be needed, after which the operator holds the handle part $e$ with one hand, while with the other he takes hold of and turns the handle part $d$ toward the right, causing the screw-plug and clamping-bars to be moved in the direction shown by arrows in Fig. 2, until the cam-faces $b'\ b'$ are brought sufficiently in contact with the edges in the capped ferrule to cause the blade *a* to be clamped firmly between said grooved clamping-bars.

The perforation *e'* in the handle part *e* being made flattened in section to correspond to the width of the clamping-bars, it will be seen that the latter are prevented from turning around within said handle part *e* when the handle portion *d* and its nut *f* are turned around the plug *g*, as above stated.

The clamping-bars *b b* being free to adjust themselves in their inner ends on the pin *h*, it will be seen that blades of various widths may be used and that such blade or tool will be held throughout its length (except that portion of it outside of the holder) within the said grooved clamping-bars, thus causing said blade or tool to be rigidly secured to the holder while the device is in use. In tools of this kind heretofore used the nut for operating the clamping-bars has to be manipulated by means of a screw-driver or similar device, which is objectionable, as such device may not always be handy or be within the reach of the operator.

In my improved holder I am entirely independent of a screw-driver or similar tool for operating the clamp-actuating nut, as all that is needed is to grasp the handle parts *d* and *e* and to turn one around its axis relative to the other in loosening or securing the tool from or to the holder. In tools of this kind the handle generally terminates in a metal nut or washer, usually scored, which is an objectionable feature, as it is liable to chafe and injure the hand of the operator while using the tool. Such objection is overcome in my invention by having the end of the handle part *d* solid and the nut *f* arranged inside of the same, as shown and described.

What I wish to secure by Letters Patent and claim is—

The knife-blade holder, as described, consisting of the grooved clamping-bars *b b*, having cam projections *b' b'* in their outer ends, and having their inner ends pivoted within the longitudinally-perforated screw-threaded plug *g*, combined with the longitudinally-grooved handle part *e*, having the capped ferrule *c*, and the handle part *d*, having the nut *f*, surrounding the plug *g*, substantially as and for the purpose set forth.

In testimony whereof I have signed my name to this specification, in the presence of two subscribing witnesses, on this 11th day of February, A. D. 1889.

WILLIAM O. CREE.

Witnesses:
ALBAN ANDRÉN,
GEORGE A. CLOUGH, Jr.